H. Wright,

Pitcher Top.

No. 2,921. Reissued Apr. 21, 1868.

Witnesses:

Chas. H. Park
B. B. Lewis Jr.

Inventor

Homer Wright

N. PETERS, PHOTO-LITHOGRAPHER, WASHINGTON, D. C.

United States Patent Office.

HOMER WRIGHT, HENRY H. COLLINS, AND BENJAMIN F. COLLINS, OF PITTSBURG, PENNSYLVANIA, ASSIGNEES OF HOMER WRIGHT.

*Letters Patent No.* 69,151, *dated September* 24, 1867; *reissue No.* 2,921, *dated April* 21, 1868.

IMPROVEMENT IN THE CONSTRUCTION OF JUG-TOPS.

The Schedule referred to in these Letters Patent and making part of the same.

TO ALL WHOM IT MAY CONCERN:

Be it known that I, HOMER WRIGHT, of Pittsburg, in the county of Allegheny, and State of Pennsylvania, have invented a new and useful Improvement in Jug-Tops; and I do hereby declare that the following is a full and exact description thereof, reference being had to the accompanying drawings, making a part of this specification, in which—

Similar letters of reference indicate corresponding parts in the several figures.

This invention relates to an improvement in an article of manufacture known as a jug-top, and has for its object, first, the forming of the hinge and knob of a jug-top of one piece of metal, either by casting the same in a metallic mould, from Britannia or other soft metal, or forming it up from sheet metal; second, the forming of the lid of such size and shape as to cover entirely the top of the jug-top; third, the forming of an opening in the lid to receive the said knob; fourth, the forming of a convex bulge on the back part of the lid; fifth, the forming of a flange on the inner diameter of the body, so shaped as to compensate for the thickness of the hinge; sixth, hinging the lid, so as to rotate from the inside of the body.

To enable those skilled in the art to fully understand and construct my invention, I will proceed to describe it.

Figure 3:
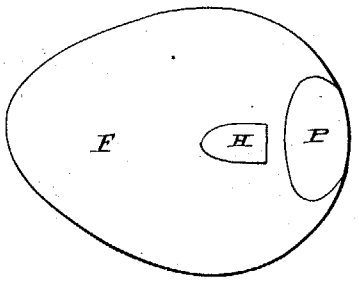
Figure 3 is a diagram of the lid of my jug-top.
Figure 5:
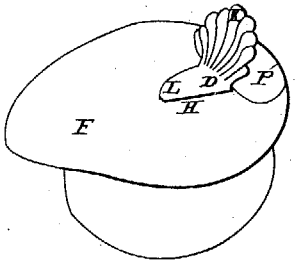
Figure 5 is a view of a finished jug-top.
Figure 1:
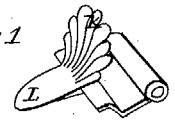
Figure 1 is a view of my combined hinge and knob.
Figure 2:
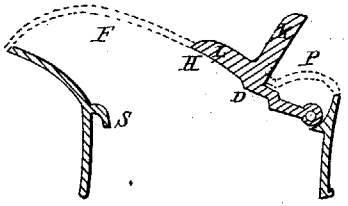
Figure 2 is a sectional diagram of my jug-top.
Figure 4:
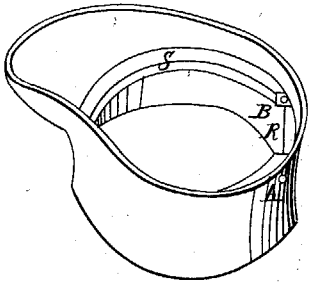
Figure 4 is a view of the body of my jug-top, showing the flange therein.

I cast my jug-top "body," fig. 4, from soft metal, (Britannia, for example,) in a metallic mould, and of the usual form, except, first, that I cast it over a wire, which forms a hole, A B, in which the hinge-wire is afterwards inserted; second, I cast a flange, S, on the inner diameter of the body, in which is a recess, R, for the reception of the hinge; said flange being so formed as to compensate for the thickness of the hinge, (permitting the hinge to be placed below the level of its top,) and making a snug fitting and protection for the cement and glass, when the top is applied to the mouth of the jug. It is next put in the lathe and turned out on the inside, when it is ready to receive the combined hinge and knob-piece represented by fig. 1, also in figs. 2 and 5, at D. This piece being hinged to the body by a proper wire, the holes A B are next closed with solder, which completely secures and conceals the wire. It is now ready for the reception of the lid F, figs. 3, 2, and 5. The lid I make of one piece, and of such size and shape as to cover entirely the top rim of the body, and conceal the hinge from view when closed. The lid, in opening, swings perfectly clear of the said top rim, the hinge being attached to or within the flange, so that the lid rotates from the inside of the body. It has an opening, H, for the purpose of receiving the knob, as shown at H, figs. 2 and 5. It has also a convex bulge, P, figs. 2, 3, and 5, to permit it to swing clear of the back of the body in opening and closing. The lid is applied by first laying the knob back, then holding the lid sideways, and at right angles with the body, when the "leaf part" K of the knob will readily pass up through the opening H; then, by turning the lid around to its place, the "nose" L will close the opening H snugly. The lid is next secured to the hinge by solder, when the jug-top is ready to be turned on the outside. This is done on the lathe in the usual manner, after which it is "buffed" with sand and oil, on a leather wheel, which completes the process.

By this arrangement it will be seen that a jug-top can be made, having the flange so formed as to compensate for the thickness of the hinge, permiting it to be inserted below the level of its top; having the lid to cover entirely the top rim of the body, with its hinge on the inside, and rotating from the inner diameter of the body; having the hinge and knob combined in one piece, which, in combination with the opening in the lid, and the convex bulge on the back part of the lid, produces a combination easily fitted up, with a great saving of labor over the old process, and a great improvement in appearance when finished.

Having thus described my invention, what I claim as new, and desire to secure by Letters Patent, is—

1. The flange S, when made as and for the purpose shown.
2. The hinge and knob combined in one piece, as specified.
3. The lid, when made to cover entirely the top rim of the body, as set forth.
4. The opening H, in the lid, when used in combination with the hinge and knob-piece, as described.
5. The convex bulge P, or its equivalent, when used for the purpose indicated.
6. Hinging the lid so as to rotate from the inside of the body, as described.

HOMER WRIGHT.

Witnesses:

WM. MCFARLAND,
B. C. CHRISTY.